United States Patent [19]

Nakagawa et al.

[11] 3,718,917

[45] Feb. 27, 1973

[54] DRIVING SYSTEM OF MAGNETIC THIN FILM MEMORY

[75] Inventors: Shiro Nakagawa, Chiba; Mutsuo Ishikawa, Nagareyama, both of Japan

[73] Assignee: T. D. K. Electronics Corporation, Tokyo, Japan

[22] Filed: March 15, 1971

[21] Appl. No.: 123,978

[30] Foreign Application Priority Data

March 23, 1970 Japan ................................45/24298

[52] U.S. Cl.......................340/174 TF, 340/174 AC, 340/174 GA, 340/174 M, 340/174 PW, 340/174 BA

[51] Int. Cl...........................G11c 15/00, G11c 11/14

[58] Field of Search....340/174 TF, 174 PW, 174 GA

[56] References Cited

UNITED STATES PATENTS 3,585,615 6/1971 Takahashi.....................340/174 GA

*Primary Examiner*—James W. Moffitt
*Attorney*—Burgess, Ryan & Wayne

[57] ABSTRACT

In a magnetic thin film memory, writing a word or information into a selected storage location will adversely affect the information stored in the adjacent storage locations. To overcome this problem, the information previously stored in a selected storage location into which new information is to be written is read out and compared with the new information so that only when the stored information does not coincide with the information to be written, the latter is written.

1 Claim, 2 Drawing Figures

WRITE DRIVE SYSTEM FOR ONE DIGIT LINE

CYLINDER-TYPE MAGNETIC THIN FILM MEMORY PLANE

WRITE DRIVE SYSTEM FOR ONE DIGIT LINE

DRIVING SYSTEM OF MAGNETIC THIN FILM MEMORY

BACKGROUND OF THE INVENTION

The present invention relates to generally a driving system of a magnetic thin film memory and more particularly a write drive system in which information stored in storage locations other than a selected storage location are not adversely affected or disturbed when new information is to be written into the selected storage location.

The magnetic thin film memory has the advantages of high speed operation and a small power consumption, so that it has come to be used as a main memory in high-speed computers. However, the magnetic thin film memories are not as widely used as expected in the early stage of its research and development, because there exist various spurious signals and also the requirements for the various characteristics of the magnetic thin film memories. As a consequence, the yield in fabrication is low and the cost is expensive.

In the magnetic thin film memory, the pulse currents are made to flow in both the selected word drive line and digit line, so that the information may be stored in a storage location at the intersection of the selected word drive and digit line by controlling a direction of magnetization of the storage location. In this case, only one of the word drive and digit lines is energized in other storage locations, the directions of the magnetization in these locations remaining unchanged. However, assume that "0" is to be written into a storage location arrayed on the same digit line of another storage location holding "1." In this case, it is seen that the pulse current for writing "0" will adversely affect or disturb the information "1" stored in the other storage location. When the other storage location is disturbed many times, a magnetization reversal takes place from a portion of the other storage location at which the "1" is relatively loosely held and gradually propagates over the whole storage location region. Finally the direction of magnetization is completely reversed, that is, the "1" signal is destroyed. This disturbance is especially found at the storage locations adjacent to the selected storage location into which information is written. That is, the magnetic field produced by the current passing through the word drive line located on the storage location to be selectively written in with the information "0," extends into the neighboring storage location where the information "1" is already stored. Therefore the spacing between the word drive lines crossing the digit line is limited so that the packing density of the storage location is limited. Because of these strict requirements imposed on the information retentivity of the magnetic thin film memories, the fabrication is difficult, time consuming testing to determine the characteristics of memories is required, and the cost is expensive.

The stored information is disturbed not only by writing but also by readout. In the nondestructive readout, when the information stored in one selected storage location is read out many times, the output voltage is gradually decreased. However, this readout disturbance occurs only the first few readouts. More particularly, the experiments showed that the readout voltage is reduced by about 10 percent in the first few readouts, and thereafter, the readout voltage remains almost unchanged.

It is therefore the primary object of the present invention to provide a write drive system in which the disturbance to the stored information in case of writing may be reduced.

SUMMARY OF THE INVENTION

As previously stated, in the magnetic thin film memories, the disturbance by writing is strong while the disturbance by readout is weak. The present invention is based upon this finding and provides a write drive system of magnetic thin film memories in which the information previously stored in a selected storage location into which is written new information is read out prior to writing and is compared with the new information so that when they are the same, no writing may be accomplished.

When a first storage location holds "1" and if "0" is written into a second storage location on the same digit line, the storage "1" in the first storage location is disturbed as previously stated. However, when the information readout from the second storage location prior to writing in "0" and the read information is "0," the new information "0" is not written into the second storage location so that the information stored in the first storage location is not disturbed at all. Only when the readout information from the second storage cell is "1," the new information "0" is written into the second storage cell. The information stored in the first storage cell is of course disturbed in this case.

According to one aspect of the present invention, the information to be written into a selected storage location is stored once in a write register and the information previously stored in the selected storage location is read out and stored in a readout register prior to writing. The contents of the write and readout registers are compared in a coincidence circuit, so that when the contents coincide with each other a coincidence signal is applied to a gate circuit which in turn inhibits or deactivate a digit driver. As a consequence the information held in the write register is not written into the selected storage location. However, when the contents of the write and readout registers are different, no control signal is applied to the gate circuit so that the digit driver is activated, so as to write the information stored in the write register into the selected storage location.

According to the present invention, a number of disturbances caused by writing may be reduced to the minimum. In addition the requirements imposed upon the properties of the magnetic thin films may be remarkably relaxed and the problems associated with the fabrication may be substantially overcome. Furthermore, the operational margin of the magnetic thin film memories may be increased so that the load upon the peripheral circuitry may be reduced. Because the number of disturbances caused by writing is reduced to the minimum, the reliable results may be obtained from the tests of the characteristics of the magnetic thin film memories within a short time. A number of disturbances upon one storage location from its adjacent locations is two times at the most so that the spacing between the word drive lines may be minimized. As a consequence a high packaging density may be attained.

In the description of the preferred embodiment of the present invention, the present invention is described with reference to a cylinder type magnetic thin film memory, but it is understood that the present invention may be also applied to other types of magnetic thin film memories such as a plane type magnetic thin film memory.

Figure 1:
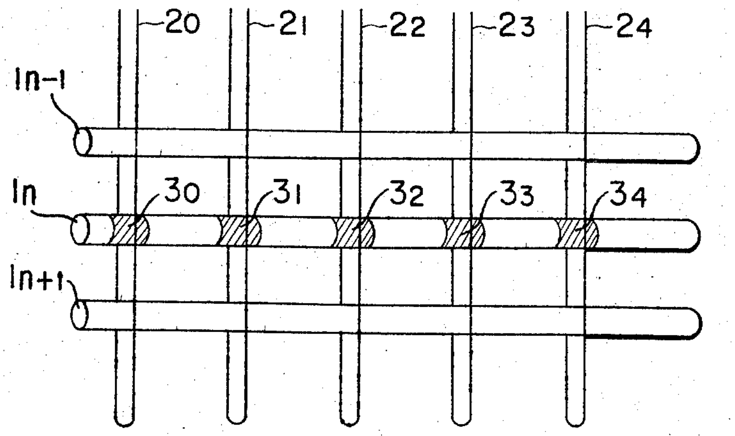
FIG. 1 is a fragmentary view illustrating a cylinder type magnetic thin film memory plane.

DESCRIPTION OF THE PREFERRED EMBODIMENT:

Referring to FIG. 1, a cylinder-type magnetic thin film memory plane comprises digit lines $1_{n-1}$, $1_n$ and $1_{n+1}$ wrapped or sandwiched by word drive lines $2_0$, $2_1$, $2_2$, $2_3$ and $2_4$. Each of the digits lines comprises a copper wire coated with a thin magnetic film. Bit storage locations $3_0$, $3_1$, $3_2$, $3_3$ and $3_4$ are the intersections between the digit line $1_n$ and the word drive lines $2_0$–$2_{4a}$.

To store the information in the storage location $3_1$, the pulses are simultaneously applied to the word drive line $2_1$ and to the digit line $1_n$ so as to control the direction of magnetization. The pulses are so shaped that when they are applied to only one of the word drive lines $2_0$–$2_4$ or digit lines $1_{n-1}$–$1_{n+1}$ the direction of magnetization of the storage locations cannot be controlled or rotated. As a result, only when the pulses are applied to both of the word drive line $2_0$ and to the digit line $1_n$, the information may be stored in the storage location $3_0$ alone but not in other storage locations $3_1$, $3_2$, $3_3$ and $3_4$. However, when the storage location $3_1$ is stored with the information "1," this information is affected by the current in the digit line $1_n$ writing in the information "0" any one of the storage locations $3_0$, $3_2$, $3_3$ and $3_4$. More particularly, when the pulse current is applied many times to the digit line $1_n$, the magnetization reversal takes place from one end of the storage location $3_1$ in which the information is not securely held. Thus the magnetization reversal extends gradually in the storage location $3_1$ and finally all the magnetization in the storage location $3_1$ are completely reversed. The magnetization reversal in the storage location $3_1$ tends to occur especially when the information opposite to that held in the storage location $3_1$ is written many times into the adjacent storage locations $3_0$ or $3_2$ because the magnetic flux of word drive line $2_0$ or $2_2$ affects the storage location $3_1$.

The present invention therefore overcomes the above writing disturbance problem by reducing a number of writings by reading out the information previously stored in a storage location into which is written the new information to see whether the stored information coincides with the new information to be written or not so that if they coincide with each other no writing is carried out.

As pointed out earlier, the holding of information "1" in the storage location $3_1$ is disturbed when "0" is written into other storage locations $3_0$, $3_2$, $3_3$ or $3_4$. However in the destructive readout system both of writing and readout may be accomplished within one clock time so that when "0" is to be written into the storage location $3_0$ and if the storage location $3_0$ has already been holding "0," writing of "0" is not accomplished. As a consequence the information stored in the storage location $3_1$ is not adversely affected or disturbed. On the other hand, if the storage location $3_0$ holes "1," the "1" is erased and "0" is written, so that the information "1" stored in the storage location $3_1$ is disturbed. As long as the storage location $3_0$ holds "0," writing "0" into this storage location will not be made. Therefore, when all of the storage locations $3_0$–$3_n$ ($3_n$ is not shown) hold "1," a number of $(n-2)$ writings is accomplished, but no writing is made beyond $(n-2)$ times in succession. This means that the storage location under consideration is disturbed only $(n-1)$ times at the most. In general, $n$ is of the order of 256 - 4,096 so that the a number of disturbance may be remarkably reduced. Furthermore it is noticed that the storage location under consideration is disturbed two times at the most from the writing operation into the adjacent storage locations. This means that the requirements for the cylinder-type magnetic thin film memory may be relaxed.

Figure 2:
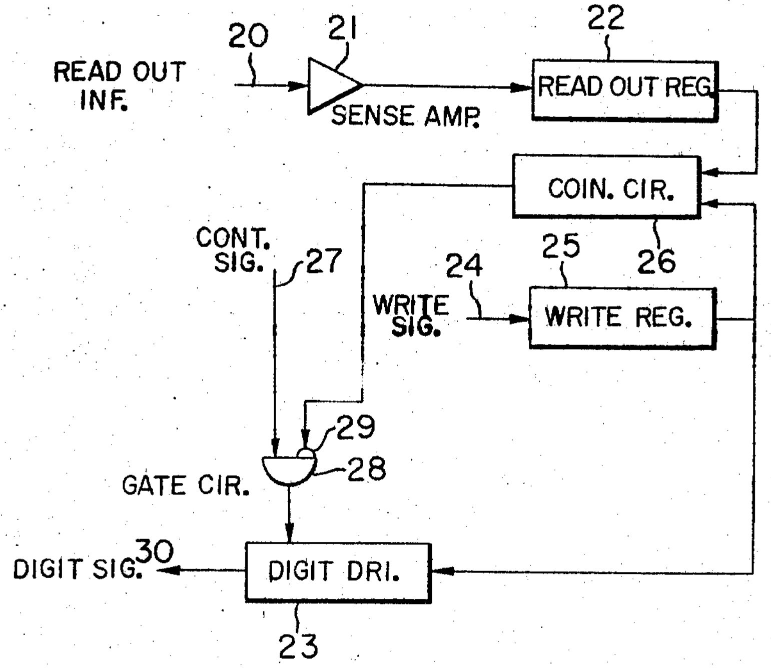
FIG. 2 is a block diagram of a write drive system in accordance with the present invention, the circuitry being only for one digit line.

FIG. 2 is a block diagram of a write drive system in accordance with the present invention illustrating only one circuitry for one digit line. As in the prior art write drive system, the write drive system in accordance with the present invention also includes a sense amplifier 21 for amplifying the information 20 read out from a storage location, a readout register 22 for holding the signals from the amplifier 21, and a digit driver 23 for driving a predetermined digit line (See FIG. 1). In addition the write drive system in accordance with the present invention includes a coincidence circuit 26 which compares the content in the readout register 22 with the content of a write register 25 which holds the information to be written and generates a coincidence signal when the contents of the readout and write registers 22 and 25 coincide with each other; and a gate circuit 28 which prevents the application of a control signal 27 to a digit driver 23 when there exists the coincidence signal.

Next the mode of operation will be described, the information 24 to be written into a storage location is first held in the write register 25. When the write instruction (not shown) is given, the information 20 previously stored in the storage location into which is written the new information 24 is read out and set in the readout register 22 through the sense amplifier 21. Next the coincidence circuit 26 compares the contents of the readout and write registers 22 and 25 and when the contents coincide with each other, the coincidence signal is applied to an inhibit terminal 29 of the gate 28 so that the control signal 27 is prevented from being applied to the digit driver 23. On the other hand, when the contents do not coincide with each other the gate circuit 28 remains opened so that the digit driver 23 is activated. As a consequence the digit drive signal 30 corresponding to the content in the write register 25 is transmitted from the digit driver 23, to thereby accomplish writing. Readout operation may be accomplished in the similar manner as in the case of the conventional nondestructive readout.

We claim:

1. A write drive system for a magnetic thin film memory readout comprising, a row of magnetic digit lines capable of storing binary information at selected storage locations, a plurality of column drive conductors perpendicular to said magnetic digit lines, a digit driver capable of writing binary information into said selected storage location corresponding to binary information of a write register, means for reading out binary information previously stored in selected storage locations prior to said digit driver performing the writing operation, a write register for holding said binary information to be written, a readout register for holding said readout information, means for comparing binary information in said readout register with the information in said write register column, and gating means to activate said digit driver only when there is a lack of coincidence between said readout information and said information to be written.

* * * * *